(12) United States Patent
Potocnik et al.

(10) Patent No.: US 6,960,863 B2
(45) Date of Patent: Nov. 1, 2005

(54) COMMUTATOR FOR AN ELECTRIC MACHINE

(75) Inventors: Joze Potocnik, Idrija (SI); Ludvik Kumar, Idrija (SI)

(73) Assignee: Kolektor Group D.O.O., Idrija (SI)

( * ) Notice: Subject to any disclaimer, the term of this patent is extended or adjusted under 35 U.S.C. 154(b) by 0 days.

(21) Appl. No.: 10/994,592

(22) Filed: Nov. 19, 2004

(65) Prior Publication Data

US 2005/0073214 A1 Apr. 7, 2005

Related U.S. Application Data

(63) Continuation of application No. PCT/EP04/001145, filed on Feb. 8, 2004.

(30) Foreign Application Priority Data

Feb. 14, 2003 (DE) .......................................... 103 06 516

(51) Int. Cl.[7] .............................................. H02K 39/08
(52) U.S. Cl. ......................................... 310/233; 310/51
(58) Field of Search ...................... 310/43, 51, 233–236

(56) References Cited

U.S. PATENT DOCUMENTS

| | | | |
|---|---|---|---|
| 5,717,270 A | | 2/1998 | Lau et al. |
| 5,895,990 A | * | 4/1999 | Lau .............................. 310/51 |
| 5,962,946 A | * | 10/1999 | Kobman et al. ............. 310/233 |
| 6,160,337 A | * | 12/2000 | Warner ........................ 310/233 |
| 6,285,106 B1 | | 9/2001 | Oki |

FOREIGN PATENT DOCUMENTS

| | | |
|---|---|---|
| DE | 43 38 345 A1 | 5/1995 |
| EP | 0 364 292 | 10/1989 |

* cited by examiner

*Primary Examiner*—Thanh Lam
(74) *Attorney, Agent, or Firm*—Katten Muchin Rosenman LLP

(57) ABSTRACT

A commutator for an electric machine comprises a support member (1) made from an insulating molding compound, a plurality of metal conductor segments (3) disposed thereon in evenly spaced manner around the commutator axis (2), with terminal elements disposed thereon for a rotor winding, and an interference-suppression device (9, 9'), to which the conductor segments (3) are connected in electrically conductive manner and which comprises a number of individual interference-suppression elements (10) corresponding to the number of conductor segments (3), wherein the conductor segments (3) are provided with contact tabs (18), which are respectively connected, at a distance from their root points (19), via associated contact points (23), to the adjoining contact poles (24) of two neighboring interference-suppression elements (10). These contact tabs (18) are designed to be radially resilient and, in the region between their root point (19) and their contact point (23), are separated from the adjacent rigid components of the commutator in such a way that, in this region, the position of the contact tabs (18) relative to that of these respective rigid adjacent components of the commutator can vary as a function of thermal expansion.

20 Claims, 7 Drawing Sheets

COMMUTATOR FOR AN ELECTRIC MACHINE

CROSS-REFERENCE TO RELATED APPLICATION

Figure 1:
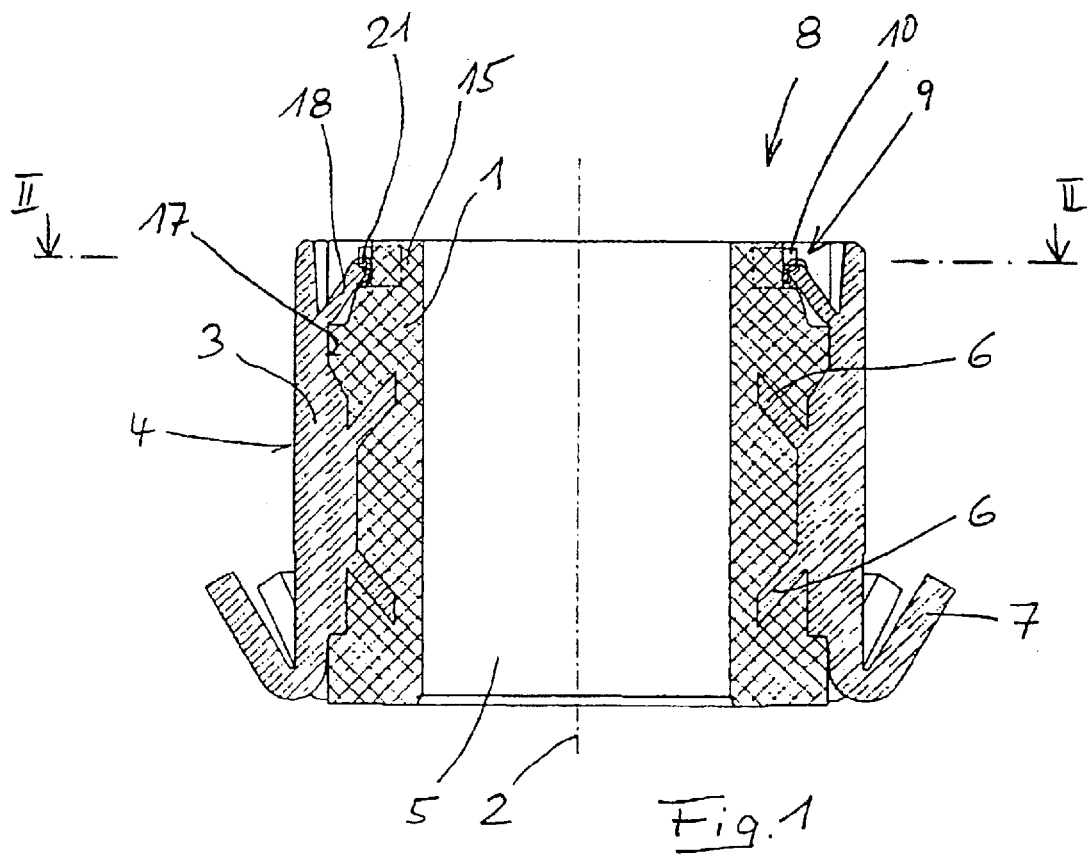

The present application is a continuation of International Application No. PCT/EP04/001145, which was filed on Feb. 8, 2004, which is herein incorporated by reference.

The present invention relates to a commutator for an electric machine, comprising a support member made from an insulating molding compound, a plurality of metal conductor segments disposed thereon in evenly spaced manner around the commutator axis, with terminal elements disposed thereon for a rotor winding, and an interference-suppression device, to which the conductor segments are connected in electrically conductive manner and which comprises a number of individual interference-suppression elements corresponding to the number of conductor segments, wherein the conductor segments are provided with contact tabs, which are respectively connected, at a distance from their root points, via associated contact points, to the adjoining contact poles of two neighboring interference-suppression elements.

Commutators of various designs (drum commutators, flat commutators) are known in diverse configurations. To an increasing extent, commutators are being equipped with spark-suppression devices, especially if they are designed as drum commutators, in order to prevent sparking at the commutator from impairing electronic assemblies disposed in physical proximity to the electric machine in question.

Heretofore such interference-suppression devices have often been designed as annular interference-suppression disks, which are made of a material having voltage-dependent resistance and which are connected in electrically conductive manner to the conductor segments. In such cases the corresponding interference-suppression disk can be mounted on the one hand radially outward of the brush running surface (for example, see U.S. Pat. No. 5,895,990 A, U.S. Pat. No. 5,717,270 A, GB 2183933 A and U.S. Pat. No. 5,796,203 A), or on the other hand radially inward of the brush running surface (for example, see U.S. Pat. No. 6,285,106 B1 and DE 19953231 A1). Also known are special forms of interference-suppressed drum commutators, in which the conductor segments are disposed on the outside of cylindrical interference-suppression sleeves (see DE 2055648 and DE 3614869 C2). EP 364292 B1 describes a drum commutator with a support member made of thermoplastic material, in which a heat-resistant reinforcing ring is provided radially underneath the terminal lug, which ring is provided with an interference-suppressing coating or can be disposed adjacent to a separate interference-suppression ring; in common with the separate interference-suppression ring that may be provided in addition, this reinforcing ring is mounted on a seat of the support member, where it is retained by straps protruding from the conductor segments.

Regardless of the respective specific arrangement of interference-suppression disks, the considerable costs for the interference-suppression device constitute a disadvantage in all commutators whose interference-suppression device comprises an annular interference-suppression disk, since the ceramic material from which such interference-suppression disks are usually made is very expensive; moreover, large quantities of waste are produced in the manufacture of interference-suppression disks, since they are cut out of a multi-layer metal-ceramic plate.

Incidentally, among the known drum commutators that are interference-suppressed by using an interference-suppression disk, only compact drum commutators with interference-suppression disks disposed radially inward of the brush running surface are feasible for many practical applications, because the space available for the respective commutator is limited. A further problem of such drum commutators with interference-suppression rings disposed radially inward of the brush running surface results from the different thermal expansion behavior of the interference-suppression disk, which is usually made of ceramic material, compared with the other components of the commutators in question. Specifically, if the thermal stresses are large enough, they can cause premature failure of commutators due to broken interference-suppression disks and/or destroyed connections between the conductor segments and the interference-suppression disks, unless special precautions are taken. As a solution to this problem, it is proposed in DE 19953231 A1 that the interference-suppression disk be joined to the support member by means of an elastic adhesive and that the conductor segments be connected to the interference-suppression disk via thin wires, which are soldered on the one hand to the terminal lug of the associated conductor segment and on the other hand to an associated metallization zone of the interference-suppression disk. In contrast, according to U.S. Pat. No. 6,285,106 B1, which discloses a drum commutator of the class in question, there are provided, for electrical contact between the conductor segments and the interference-suppression disks, leaf springs that are disposed inside an annular cavity, which is bounded by the support member, the conductor segments and an annular cover, and in which the interference-suppression disk is also housed. The leaf springs, which permit different radial thermal insulation of the interference-suppression disk on the one hand and of the other commutator components on the other hand, can be fixed in particular to the annular cover.

A particular disadvantage of the two known drum commutators, evaluated in the foregoing, each with an interference-suppression disk disposed radially inward of the conductor segments is in particular the high expense of manufacture, which hampers the competitiveness of the drum commutators in question. Particularly in the case of the commutator according to EP 364292 B1, this high expense is due not only to the high manufacturing costs for the interference-suppression disk (see above) but largely also to the great number of components to be joined together. In the drum commutator according to EP 364292 B1, a further disadvantage is that the contacting resulting alone from the bearing force of the leaf springs on the conductor segments and on the interference-suppression disk is not durably reliable, for example because it can be impaired by corrosion.

DE 4338345 A1 discloses a commutator of the class in question, designed as a drum commutator with an interference-suppression device that comprises individual interference-suppression elements embedded in the support member. Each of these conductor segments is connected to respectively two mutually adjacent interference-suppression elements via two retaining stays embedded in the support member for the purpose of securing the position of the conductor segment in question. This commutator indeed does not suffer from the considerable costs associated with provision of the annular interference-suppression disk in the commutators explained in the foregoing. However, because of the different thermal expansion behavior of the different materials as explained in the foregoing, the commutator according to DE 4338345 A1 can be expected to have only a limited useful life of the contacting of the conductor segments with the interference-suppression elements.

In view of the prior art outlined in the foregoing, the object underlying the present invention is to provide a long-lived, reliable, interference-suppressed commutator of the class in question, which commutator can be produced at low costs with little manufacturing expense, and wherein it is intended in particular to make it possible to manufacture an interference-suppressed commutator with substantially the same dimensions as a non-interference-suppressed commutator of the same design.

This object is achieved according to the present invention by the fact that, in a commutator of the class in question, the contact tabs are designed to be resilient and, in the region between their root point and their contact point, each is separated from the adjacent rigid components of the commutator in such a way that, in this region, the position of the contact tabs relative to that of these respective rigid adjacent components of the commutator can vary as a function of thermal expansion.

A first characteristic feature of the commutator according to the present invention is therefore that the interference-suppression device comprises not an annular interference-suppression disk but instead a number of individual interference-suppression elements corresponding to the number of conductor segments; such individual interference-suppression elements, which as multi-layer capacitors can have in particular a parallelepiped shape, can be made from a multi-layer metal-ceramic plate without any kind of cutting and thus in particularly inexpensive manner. Furthermore, it is characteristic for the inventive commutator that contact tabs, which are integral constituents of the conductor segments, or in other words are made in one piece with the further regions of the conductor segments, are used for direct contacting of the conductor segments with the interference-suppression elements; thus the commutator according to the present invention does not have separate, additional components for contacting the conductor segments with an interference-suppression disk, as are provided according to the prior art, especially in the form of wires and leaf springs. For the purpose of the "connection" of the contact tabs to the contact poles of the respective two adjacent interference-suppression elements there is to be understood any electrically conductive contacting; in particular, a separate connecting material, such as solder, is not necessarily provided. The direct and immediate contacting between the contact tabs formed integrally on the conductor segments and the interference-suppression elements without having disadvantageous effects on the useful life of the commutator is then enabled by the fact that the contact tabs can deform to compensate for different thermal expansion behavior of the individual commutator components. The deformability of the contact tabs is in turn achieved on the one hand from their resilient design, wherein the contact points at which the contact tabs are joined to the interference-suppression elements are spaced apart from the root points of the contact tabs, at which these merge in the sense of a static restraint into the adjoining region of the conductor segments, and on the other hand from the separation of the contact tabs relative to the adjacent components, so that the said components do not hinder free compensation for expansion. In particular, in this sense, the resilient contact tabs in the inventive commutator are separated at their radial inner faces from the adjacent component disposed radially inward of the contact tabs in such a way that their distance to the component in question can be varied as a function of thermal expansion. The said separation of the resilient contact tabs relative to the respective adjacent other components of the commutator can then comprise in particular an unconstrained arrangement of the contact tabs within corresponding recesses of the support member, so that the contact tabs are surrounded by air except at their root point and their contact point; of course, complete or partial embedding of the resilient contact tabs in an elastically compliant material is also conceivable. By that separation of the resilient contact tabs from the rigid component of the commutator disposed in radially inward adjacent position, the contact tabs, depending on the respective thermal expansion of the individual components, can maintain a more or less large radial distance from the rigid components adjoining them in radially inward direction, specifically the support member made from the molding compound. Incidentally, because of the deform ability of the contact tabs, the stresses that act in the region of the fixed connection of the contact tabs to the interference-suppression elements are reduced so much that damage to this connection is excluded. The contact tabs can therefore be connected permanently to the interference-suppression elements, especially by means of simple soldered joints or even joints formed with electrically conductive adhesive in the region of the contact points.

In application of the present invention, it is therefore obviously possible, by virtue of the combinations of the features characteristic of inventive commutators, to manufacture extremely inexpensive, long-lived and compact interference-suppressed commutators with minimum production expense.

According to a first preferred improvement of the inventive commutator, the interference-suppression elements are designed as parallelepiped multi-layer capacitors and are disposed around the commutator axis along the edges of an equilateral rectangle, specifically in a manner in which each is expediently located at breaks between two mutually adjacent conductor segments. This in particular favors manufacture of the inventive commutator by a method that is simple and therefore inexpensive.

According to another preferred improvement, the width of the resilient contact tabs measured in circumferential direction in the inventive commutator is smaller than the width of the conductor segments. Furthermore, the length of the contact tabs is preferably much greater than their width, which in turn is greater than the thickness of the contact tabs. This is advantageous firstly with regard to the resilient compliance of the contact tabs; secondly, favorable installation conditions for the interference-suppression elements are obtained in this way, by the fact that each contact tab protrudes between the contact poles of two mutually adjacent interference-suppression elements, and together with the associated contact poles forms a kind of continuous contact region, wherein they each bridge the intervening space between the contact poles of the two neighboring interference-suppression elements.

Whereas the concept underlying the present invention can be advantageously adopted for commutators with different designs (drum commutators, flat commutators), the advantages achievable with the present invention are particularly marked in the case that the commutator is designed as a drum commutator with a cylindrical brush running surface. In particular, in such inventive commutators, which are designed as drum commutators, the contact tabs according to a particularly preferred improvement of the invention branch off from the inner radial face of the conductor segments. Hereby there is obtained a particularly compact design, now that the brush running surface is extended in axial direction beyond the interference-suppression device.

Several options exist for the electrically conductive connection of the contact tabs to the interference-suppression elements in the region of their contact poles. It is particularly preferred for the contact tabs to be soldered to the contact poles of the associated interference-suppression elements. However, an electrically conductive adhesive bond can also be used advantageously. Under special prerequisites, it is even conceivable that a separate joining material such as solder or adhesive can be dispensed with and that an electrically conductive contacting of the contact tabs with the interference-suppression elements can be achieved alone by the fact that the contact tabs bear under preload against the contact poles of the interference-suppression elements.

As regards the design of the terminal elements, yet another preferred improvement of the invention is characterized in that the terminal elements are designed as terminal lugs, which in the case of design of the commutator as a drum commutator are disposed in the region of the end face of the commutator opposite the interference-suppression device. In this case, the risk of damage to the connections of the contact tabs to the interference-suppression elements during welding of the rotor winding onto the terminal lugs is minimal.

To ensure that they will be permanently secured in position, it is particularly preferable that each interference-suppression element be inserted into a support-member seat countersunk axially into the support member. To brace the interference-suppression element in question in radial direction, in circumferential direction and in axial direction, the bounding walls of such a seat are disposed opposite the radial inner and outer faces, the two side faces and one end face of the interference-suppression element. It is particularly preferable for each of these seats to be bounded in radially inward and circumferential direction by a ribbed ring and in radially outward direction by molding-compound projections of the support member. However, the side faces of these interference-suppression elements are covered only partly by the ribs of the ribbed ring, in order to leave adequate space for the electrically conductive terminal of the contact tabs on the interference-suppression elements.

The ribbed ring explained in the foregoing can in particular be elongated to a ribbed sleeve, which at the end face of the commutator associated with the interference-suppression device projects out substantially beyond the interference-suppression elements, the radial dimensions of the ribbed sleeve being equal to or smaller than the radial dimensions of the ribbed ring. The corresponding ribbed sleeve forms the support for a ring element, which is made of magnetized material, especially ferrite, rare earth or semi-cobalt, and which functions to detect the angular position of the rotor armature. In another preferred improvement of the invention, each ring element of magnetized material can also be placed on a centering projection protruding axially from the support member, instead of on a ribbed sleeve; this allows the ring element to be fixed on the support member at any desired angle of rotation relative thereto.

Figure 1A:
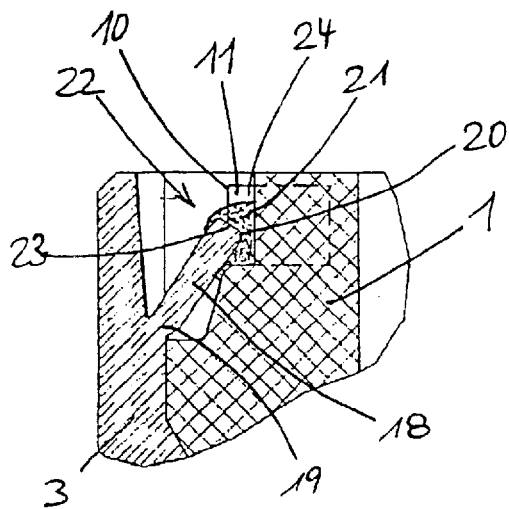
Figure 3:
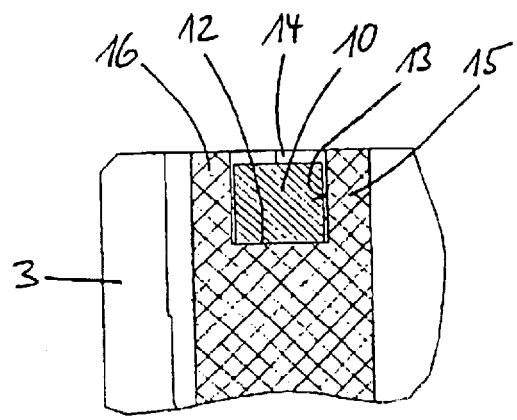
Figure 2:
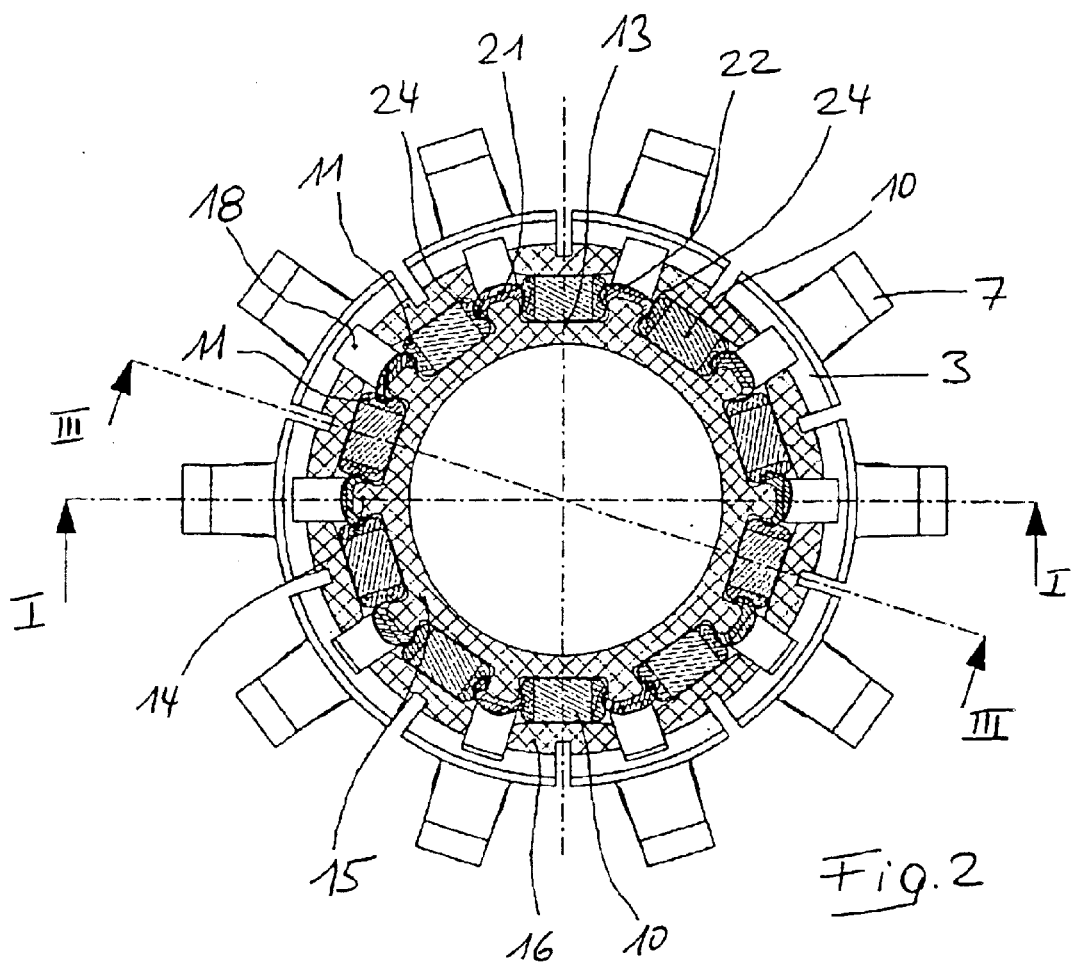
Figure 2A:
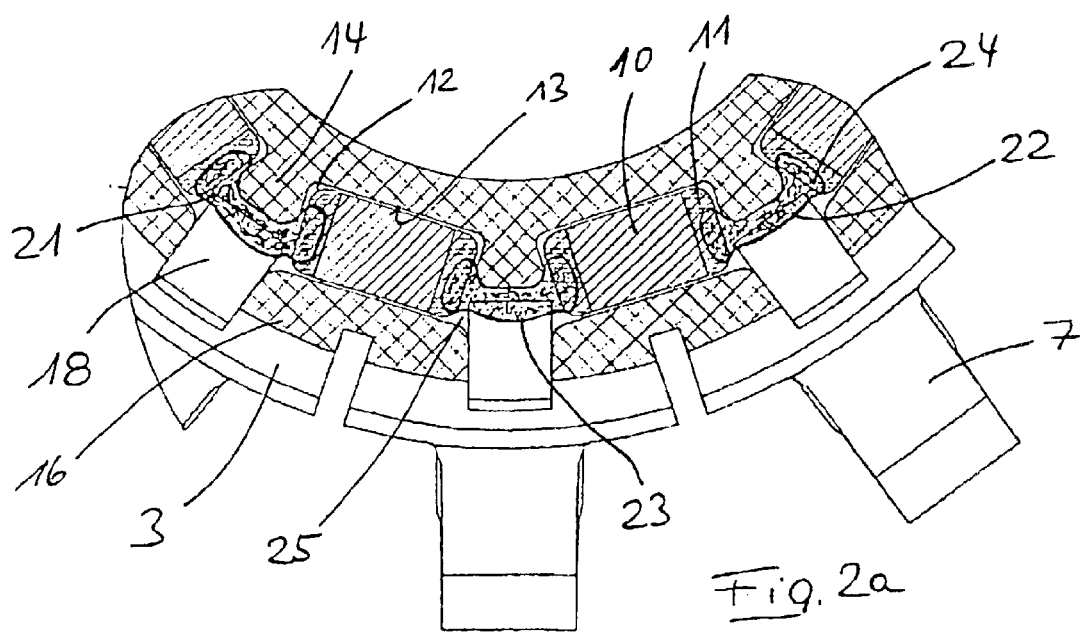
Figure 4:
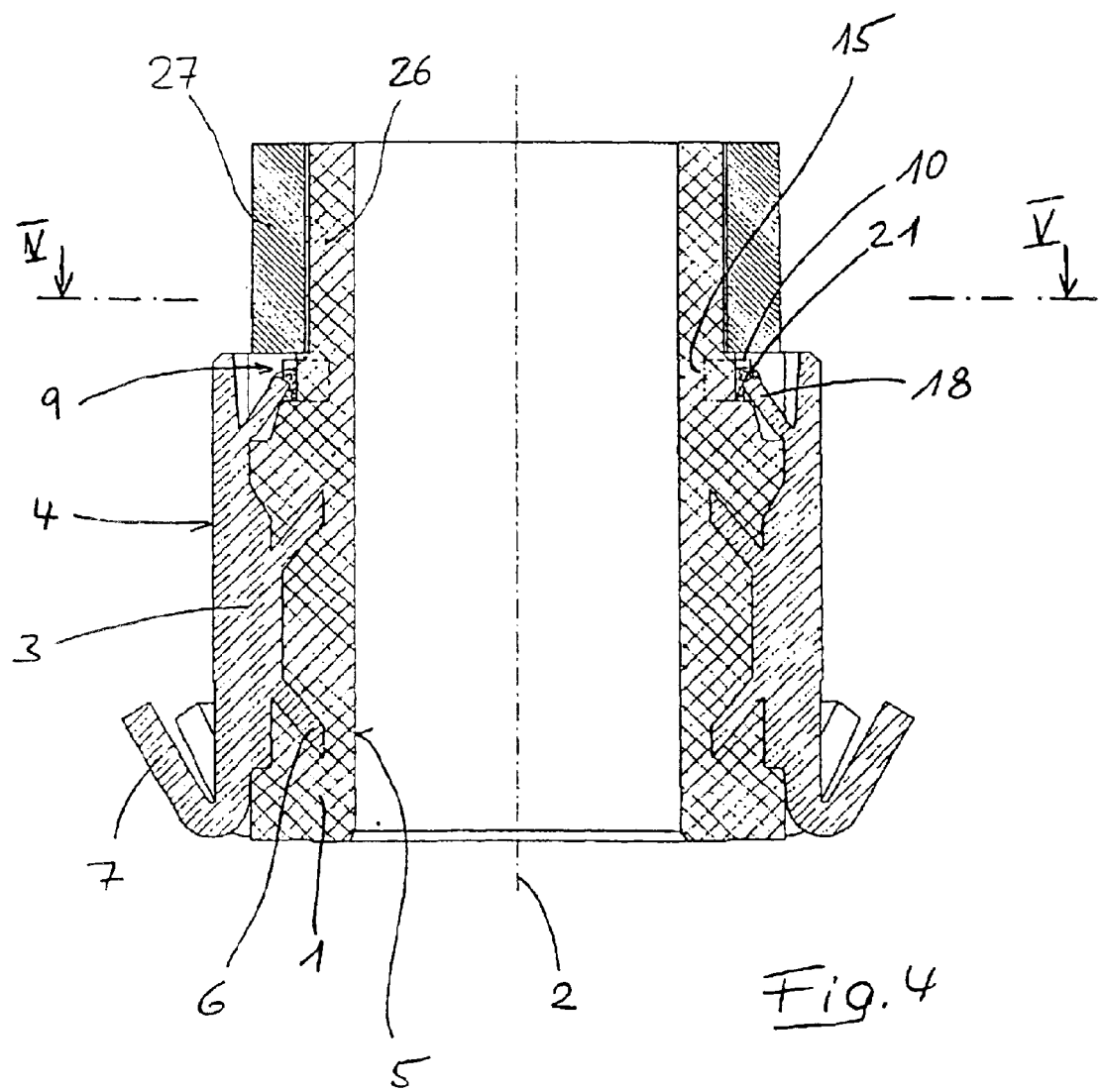
Figure 5:
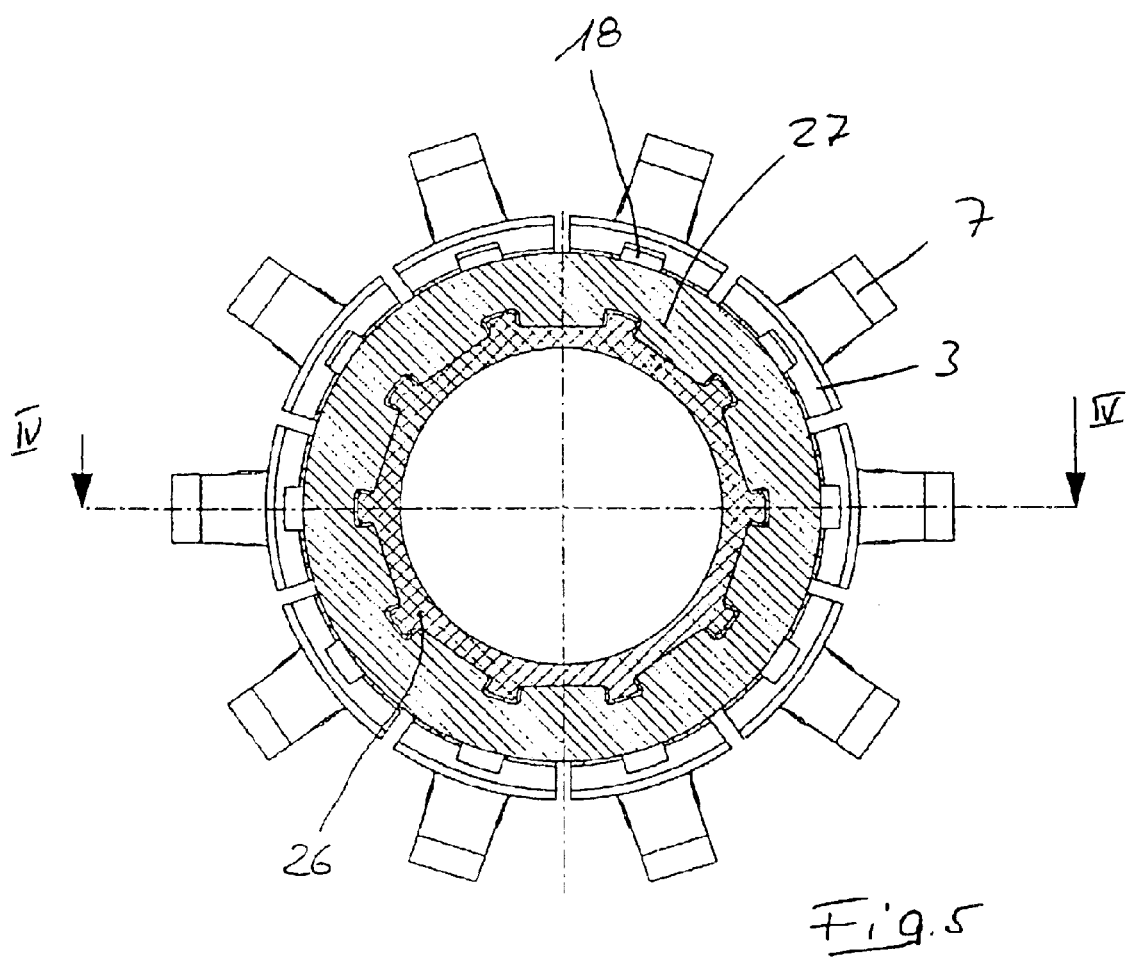
Figure 6:
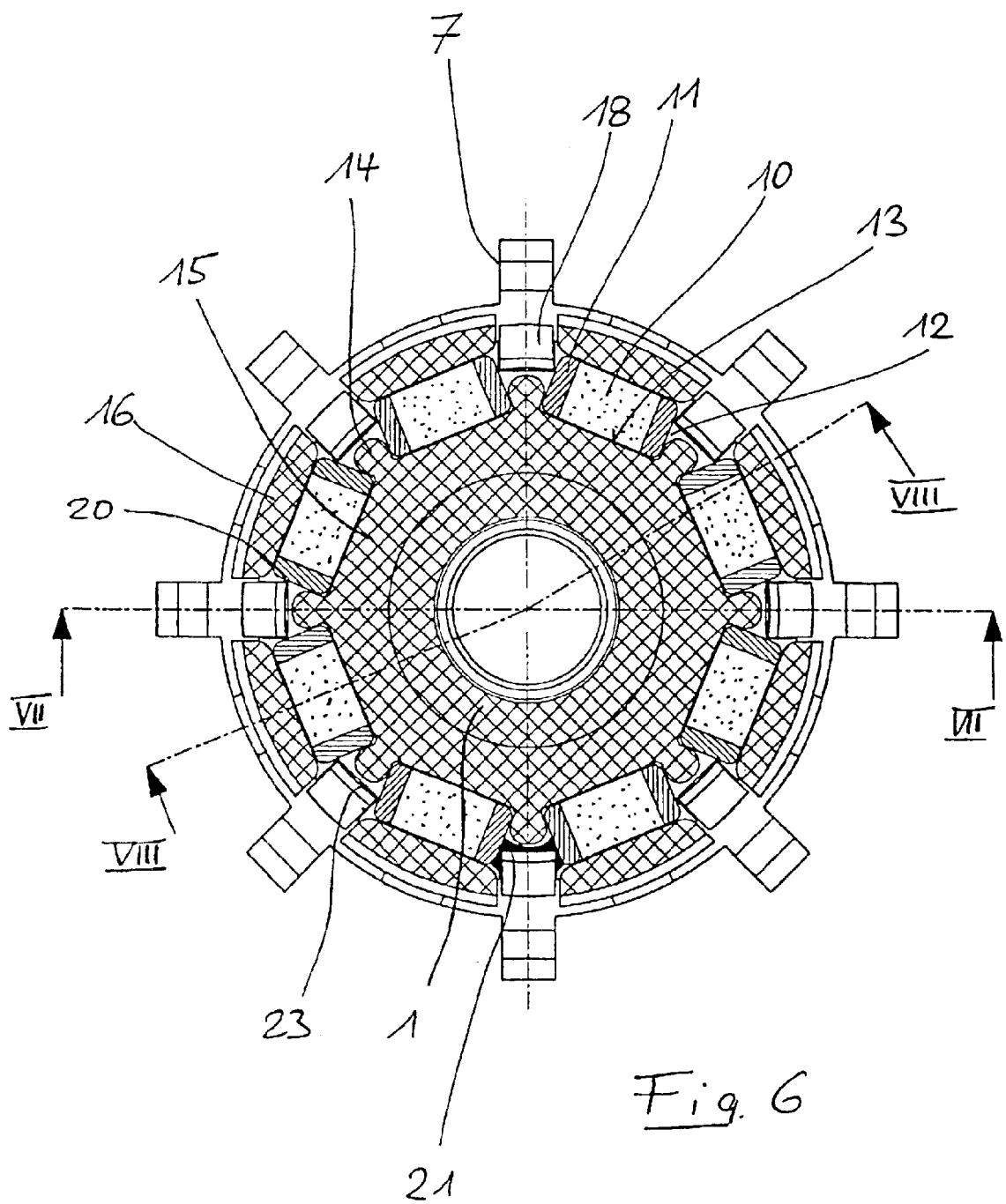
Figure 7:
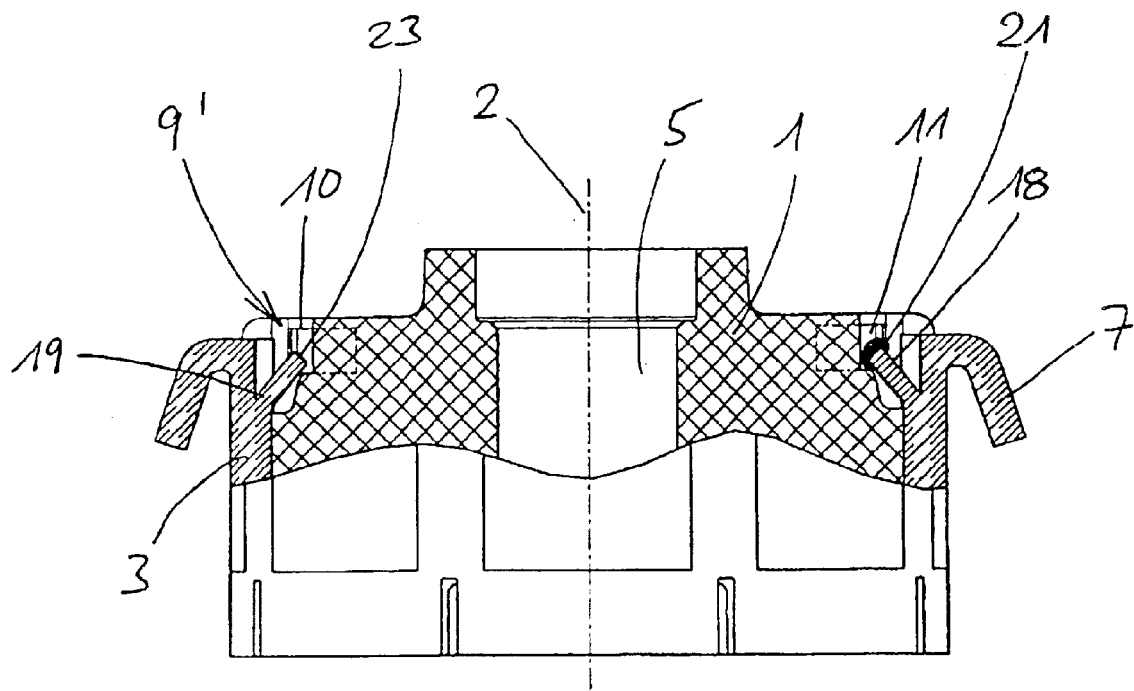
Figure 8:
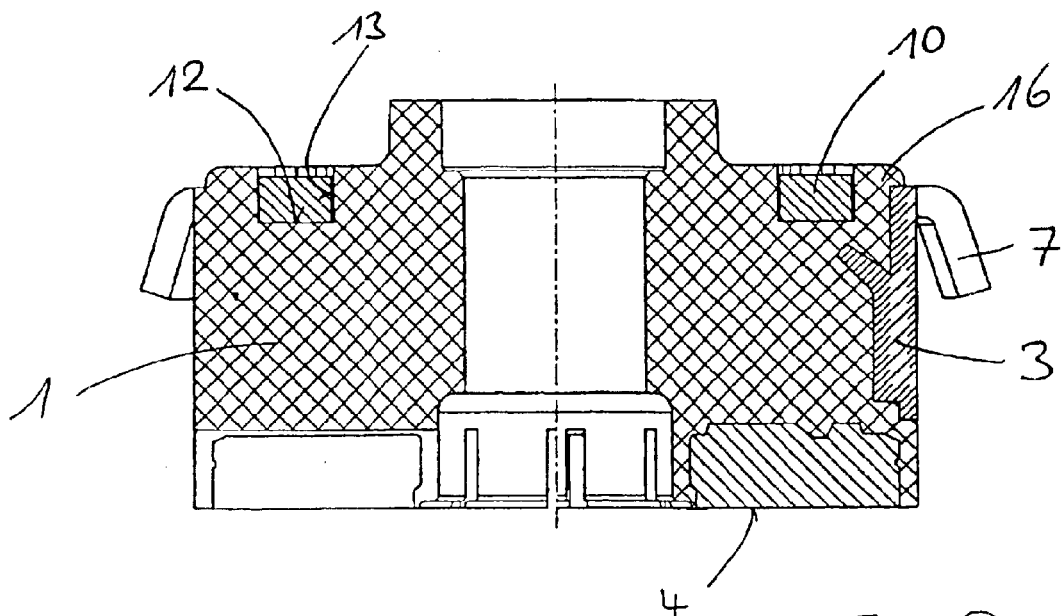
Figure 9:
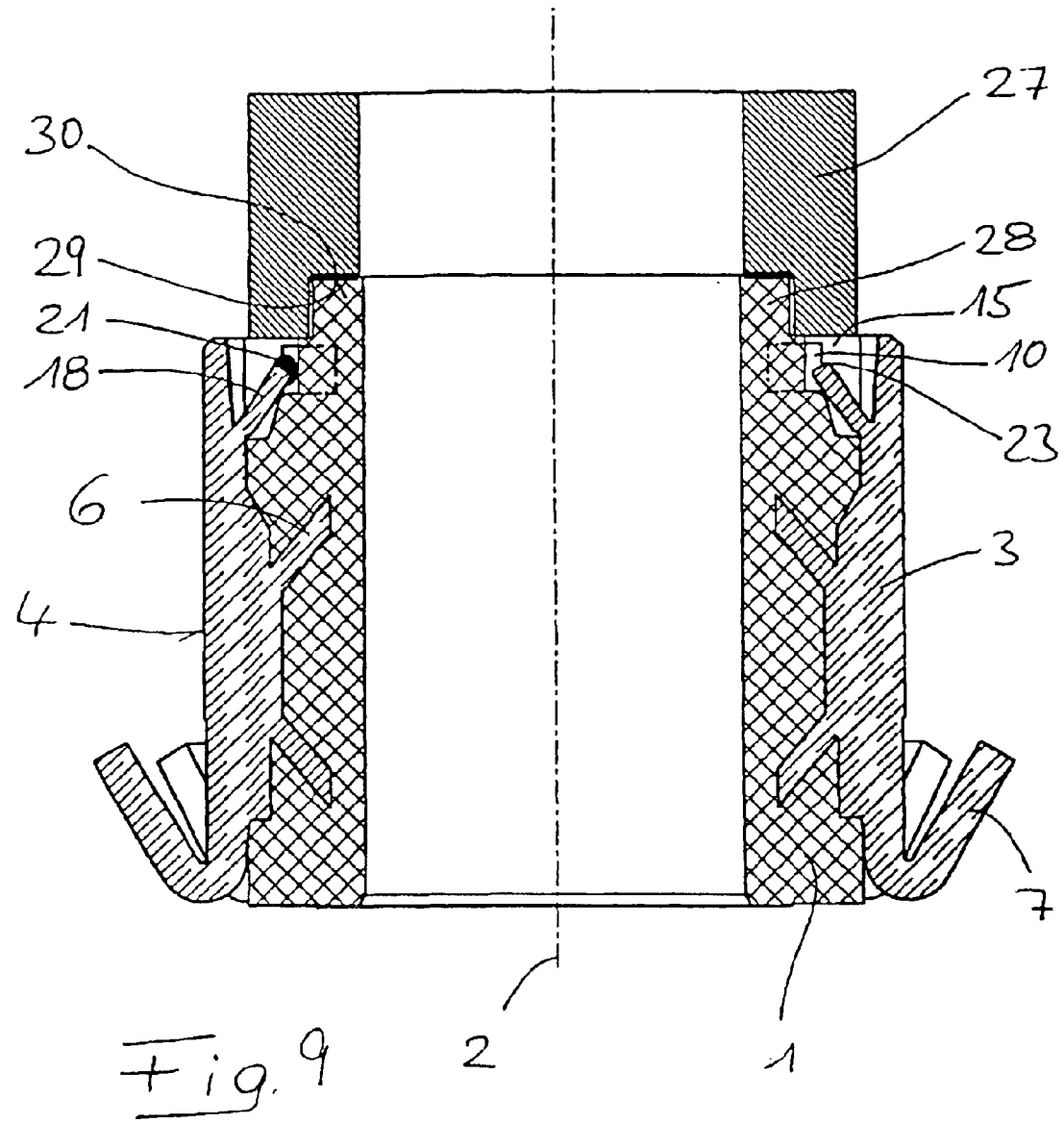

The present invention will be explained in more detail hereinafter with reference to four preferred practical examples illustrated in the drawing, wherein FIG. 1 shows an axial section through a first embodiment of a drum commutator designed according to the present invention, FIG. 1a shows an enlarged detail of FIG. 1, FIG. 2 shows a cross section through the drum commutator according to FIG. 1 along line II—II, FIG. 2a shows an enlarged detail of FIG. 2, FIG. 3 shows the enlarged detail of an axial section through the drum commutator according to FIGS. 1 and 2 along line III—III, FIG. 4 shows an axial section through a second embodiment of a drum commutator according to the present invention, modified compared with the embodiment according to FIGS. 1 to 3, FIG. 5 shows a cross section through the drum commutator according to FIG. 4 along line V—V, FIG. 6 shows a cross section through a flat commutator designed according to the present invention, FIG. 7 shows an axial section through the flat commutator according to FIG. 6 along line VII—VII in FIG. 6, FIG. 8 shows an axial section through the flat commutator according to FIGS. 6 and 7 along line VIII—VIII in FIG. 6, and FIG. 9 shows an axial section through a modification of the drum commutator according to FIGS. 4 and 5.

The drum commutator illustrated in FIGS. 1 to 3 contains as essential components a support member 1 made of insulating molding compound and ten conductor segments 3, which are disposed evenly around commutator axis 2 and whose cylindrical circumferential faces define brush running surface 4. Support member 1 is provided with a bore 5 concentric with axis 2 in order to mount the commutator on a rotor shaft.

Armature parts 6 of conductor segments 3 are embedded in the molding compound of support member 1 in order to anchor the conductor segments securely even at high speeds, despite the centripetal forces then occurring. At the ends of conductor segments 3 there are provided terminal lugs 7, which function in a manner known as such as the terminals of the winding wires on the commutator.

In the scope explained in the foregoing, the commutator according to FIGS. 1 to 3 corresponds to the long-known prior art, and so no further explanations are needed for understanding in this regard.

In the region of end face 8 opposite terminal lugs 7, the commutator is provided with an interference-suppression device 9. This comprises ten individual, parallelepiped interference-suppression elements 10 of ceramic material disposed evenly around commutator axis 2. These interference-suppression elements 10 are disposed at breaks relative to conductor segments 3. Each has a capacitor function and is provided on two mutually opposite side faces with metallized films 11. Each interference-suppression element 10 is housed in a pocket-like seat 12 of support member 1. Each seat 12 is bounded in radially inward and circumferential direction by a circumferential face 13 and two ribs 14 of a ribbed ring 15, which is part of support member 1; in radially outward direction, molding-compound projections 16 of support member 1 bound the respective seats 12 for interference-suppression elements 10. To ensure that they are secured in position, interference-suppression elements 10 are adhesively bonded in the associated seats 12.

Close to the ends of conductor segments 3 associated with end face 8 of the commutator, resilient contact tabs 18 are formed on the radially inward side 17 thereof. Starting from their respective root point 19, contact tabs 18 extend obliquely inward toward adjacent end face 8 of the commutator. Contact tabs 18 are not embedded in the molding compound of support member 1, and so deformation is possible.

Each resilient contact tab 18 of conductor segments 3 protrudes with its free end 20 between two mutually adjacent interference-suppression elements 10. By means of a soldered joint 21, which in the sense of a continuous contact region 22 encompasses both contact point 23 of conductor segment 3 disposed at the free end of the associated contact tab 18 and the adjacent contact pole 24 of the adjoining interference-suppression element 10 formed by metallized films 11, each contact tab is permanently connected in electrically conductive manner to the two adjacent interference-suppression elements. In order to create sufficient space for soldered joints 21, a gap 25 is provided in each case between ribs 14 of ribbed ring 15 and molding-compound projections 16 of support member 1.

As regards its essential geometric features, the embodiment of the inventive commutator illustrated in FIGS. 4 and 5 corresponds substantially to the embodiment according to FIGS. 1 to 3. In order to avoid repetitions, reference is made to the foregoing explanations. The main difference is merely that ribbed ring 15 is elongated to a ribbed sleeve 26, which protrudes substantially beyond interference-suppression elements 10 at end face 8 of the commutator associated with interference-suppression device 9. A ring element 27 of magnetized material (such as ferrite, rare earth or semi-cobalt) is placed on ribbed sleeve 26 and adhesively bonded thereto.

In the flat commutator designed according to the invention, as illustrated in FIGS. 6 to 8, interference-suppression device 9' comprising eight interference-suppression elements 10 is disposed in the region of the end face of the commutator opposite brush running surfaces 4. For the interference-suppression device itself, the foregoing explanations of the embodiment according to FIGS. 1 to 3 apply analogously, and so, in order to avoid repetitions, reference is made to the description of those drawings. As in the case of the drum commutator described hereinabove, contact points 23 of contact tabs 18 are connected via soldered joints 21 to the respective two neighboring interference-suppression elements 10, as illustrated diagrammatically for (only) one of the contact tabs. Incidentally, the inventive design of the interference-suppression device can be implemented for flat commutators regardless of whether the brush running surface is defined by the conductor segments themselves or else by carbon segments.

As regards its essential structural features, the drum commutator according to FIG. 9 corresponds to the drum commutator illustrated in FIGS. 1 to 3, and so, in order to avoid repetitions, reference can be made to the corresponding explanations. Once again the drum commutator is provided at its end face with a ring element 27 of magnetized material, as is the case for the commutator according to FIGS. 4 and 5. However, this is not placed on a ribbed sleeve; instead, in the drum commutator according to FIG. 9, support member 1 is elongated to an axially protruding centering projection 28. Ring element 27 of magnetized material is placed thereon. By means of an adhesive bond 30 disposed in the region of end face 29 of centering projection 28, ring element 27 is joined securely to support member 1 of the commutator.

What is claimed is:

1. A commutator for an electric machine, comprising a support member (1) made from an insulating molding compound, a plurality of metal conductor segments (3) disposed thereon in evenly spaced manner around the commutator axis (2), with terminal elements disposed thereon for a rotor winding, and an interference-suppression device (9, 9'), to which the conductor segments (3) are connected in electrically conductive manner and which comprises a number of individual interference-suppression elements (10) corresponding to the number of conductor segments (3), wherein the conductor segments (3) are provided with contact tabs (18), which are respectively connected, at a distance from their root points (19), via associated contact points (23), to the adjoining contact poles (24) of two neighboring interference-suppression elements (10), characterized in that the contact tabs (18) are designed to be radially resilient and, in the region between their root point (19) and their contact point (23), are separated from the adjacent rigid components of the commutator in such a way that, in this region, the position of the contact tabs (18) relative to that of these respective rigid adjacent components of the commutator can vary as a function of thermal expansion.

2. A commutator according to claim 1, characterized in that the interference-suppression elements (10) are designed as parallelepiped multi-layer capacitors.

3. A commutator according to claim 1, characterized in that each contact tab (18) protrudes between the contact poles (24) of two mutually adjacent interference-suppression elements (10), wherein each contact tab (18) bridges the intervening space between the contact poles (24) of the two neighboring interference-suppression elements (10).

4. A commutator according to claim 1, characterized in that the interference-suppression elements (10) are disposed at equal distances around the commutator axis (2) along the edges of an equilateral rectangle.

5. A commutator according to claim 1, characterized in that the width of the resilient contact tabs (18) measured in circumferential direction is smaller than the width of the conductor segments (3).

6. A commutator according to claim 1, characterized in that the length of the contact tabs (18) is much greater than their width, which in turn is greater than the thickness of the contact tabs (18).

7. A commutator according to claim 1, characterized in that it is designed as a drum commutator with a cylindrical brush running surface (4).

8. A commutator according to claim 7, characterized in that the contact tabs (18) branch off from the inner radial face (17) of the conductor segments (3).

9. A commutator according to claim 7, characterized in that the brush running surface (4) is extended in axial direction beyond the interference-suppression device (9), the radial thickness of the conductor segments (3) under the brush running surface (4) being greater than 0.5 mm even in the region of the interference-suppression device (9).

10. A commutator according to claim 7, characterized in that the interference-suppression device (9) is disposed at the end face of the commutator opposite the terminal elements for the rotor winding.

11. A commutator according to claim 1, characterized in that it is designed as a flat commutator, wherein the interference-suppression device (9') is disposed at the end face of the commutator associated with the terminal elements for the rotor winding.

12. A commutator according to claim 1, characterized in that the contact tabs (18) are soldered or bonded by electrically conductive adhesive to the contact poles (24) of the associated interference-suppression elements (10).

13. A commutator according to claim 1, characterized in that the contact tabs (18) are preloaded to bear upon the contact poles (24) of the associated interference-suppression elements (10).

14. A commutator according to claim 1, characterized in that each interference-suppression element (10) is inserted into a seat (12) of the support member (1), the bounding walls of which seat are respectively disposed opposite the radial inner and outer faces, the two side faces and one end face of the interference-suppression element.

15. A commutator according to claim 14, characterized in that the seats (12) are respectively bounded in radially inward and circumferential direction by a ribbed ring (15) and in radially outward direction by molding-compound projections (16) of the support member (1).

16. A commutator according to claim 15, characterized in that the ribbed ring (15) is elongated to a ribbed sleeve (26), which at the end face (8) of the commutator associated with the interference-suppression device (9) projects out substantially beyond the interference-suppression elements (10), the radial dimensions of the ribbed sleeve (26) being equal to or smaller than the radial dimensions of the ribbed ring (15).

17. A commutator according to claim 16, characterized in that a ring element (27) of magnetized material is placed on the ribbed sleeve (26).

18. A commutator according to claim 17, characterized in that the ring element (27) is made of ferrite, rare earth or semi-cobalt.

19. A commutator according to claim 17, characterized in that the ring element (27) is adhesively bonded to the ribbed sleeve (26).

20. A commutator according to claim 1, characterized in that the support member (1), at its end face (8) associated with the interference-suppression device (9), is elongated to a centering projection (, onto which there is placed a ring element (27) of magnetized material.

* * * * *